Nov. 15, 1955 M. W. SMITH 2,723,527

DISPLAY DISC FOR DISC TYPE OF CLOCK

Filed Dec. 22, 1952

INVENTOR.
MARTIN W. SMITH,
BY James N. Ryle [signature]
ATTORNEY.

2,723,527

DISPLAY DISC FOR DISC TYPE OF CLOCK

Martin W. Smith, Miami, Fla.

Application December 22, 1952, Serial No. 327,264

1 Claim. (Cl. 58—126)

Figures 1, 2, 3, 4, 5:
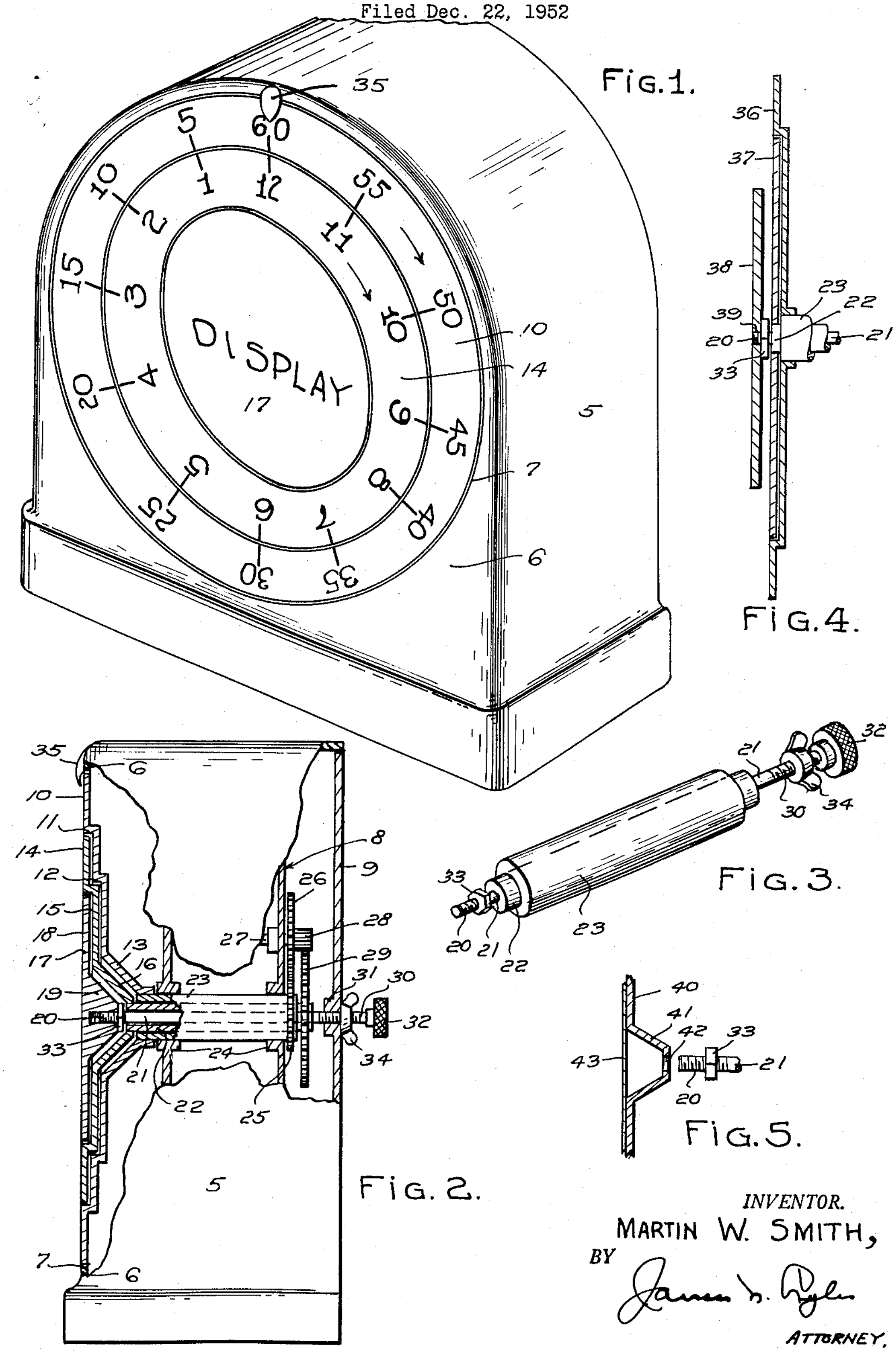

This invention relates to improvements in time pieces and particularly to clocks and is an improvement over that device disclosed in my co-pending application for a combined Visual and Braille Time Piece, filed May 26, 1951, bearing Serial No. 228,479, now abandoned.

The device of the present invention contemplates a clock having a front wall and a pair of time indicating discs, coupled with a display disc, with the several discs and the front wall of the clock casing being flush .

It is the purpose of the present invention to provide a novel arrangement of a stationary display disc that is used in conjunction with a pair of rotating time indicating discs, with the time indicating discs being nested with respect to each other and with one of the discs recessed whereby the stationary disc may be flush therewith and, with the several discs being supported and driven in a novel manner through the use of relatively conventional clock mechanism.

The display disc of this invention presents a novel support upon which various advertising matter and other ornamental display indicia may be arranged at will and with the display disc being easily and quickly removable for purposes of either redecorating or, replacing with another and similar previously decorated disc and without interfering with the novel time rotation of the time indicating discs.

Various novel features of construction and arrangement of parts will be readily apparent during the course of the following description, reference being had to the accompanying drawings wherein has been illustrated a preferred embodiment of the invention and wherein like characters of reference are employed to denote like parts throughout the several figures.

Referring to the drawings:

Figure 1 is a perspective view of a clock constructed in accordance with the invention, Figure 2 is a side elevation partly in central vertical section, illustrating the relative positions of the several discs and associated elements, Figure 3 is a perspective view of the drive shafts, for the time discs and the fixed shaft for the non-rotative support of the display disc, Figure 4 is a central vertical section through a modified form of disc and, Figure 5 is a fragmentary central sectional view of a further modified form of display disc.

Referring specifically to the drawings the numeral 5 designates a clock casing formed of any desirable material and of any desirable design. The casing 5 has a front wall 6 that is provided with a relatively large circular opening 7. Supported within the casing 5 and indicated generally by the numeral 8, is a framework commonly employed to support the conventional train of gears commonly employed in clock mechanisms and, not shown herein, since it forms no part of the present invention. The casing 5 is formed open at its rear and is normally closed by a fixed cover plate 9, detachably secured in position with respect to the casing by any suitable means.

Rotatively supported within the opening 7 and flush with the front wall 6, is a flat time indicating disc 10. The disc 10 in this instance has been stamped, etched, embossed or otherwise printed at equidistantly spaced points radially therearound with minute designations in five minute intervals of spacing, as shown. The disc 10 has been stamped to form a concentric recess 11 and, from the recess 11, the disc has been further stamped to provide a second concentric recess 12. The recess 12 is further stamped to provide a rearwardly extending conical hub 13 for a purpose to be presently described. Rotatively supported within the recesses 11 and 12 and having a flat forward face that is flush with the disc 10, is a second time indicating disc 14 upon which has likewise been impressed or otherwise displayed, indicia designations indicating the hours from one to twelve. As clearly shown in Figure 2 the disc 14 is concentric with and is adapted to rotate independently of the disc 10. The disc 14 is concentrically stamped to provide a circular recess 15, with the recess 15 centrally thereof of being stamped rearwardly to form a conical hub 16. Supported within the recess 15 and stationary with respect to the discs, is a display disc 17 circular in front elevation and concentric to the recess 15. The forward display surface 18 of the disc is flush with the surfaces of the discs 10 and 12. The disc 17 is provided centrally thereof and rearwardly extending, with a conical hub 19 apertured axially and threaded for the reception of the threaded end 20 of an non-rotative rod 21.

Referring particularly to Figures 2 and 3, it will be apparent that the rod 21 passes axially and concentrically through a tubular shaft 22, while the tubular shaft is rotatable within and concentric to a second tubular shaft 23. As clearly shown the shaft 22 projects beyond the opposite ends of the shaft 23. At its forward end, the shaft 22 frictionally receives the hub 16 of the disc 14 while the forward end of the shaft 23 frictionally receives the hub 13 of the disc 10. The shaft 23 is suitably journaled in bearings 24 carried by a frame 8. Fixedly positioned adjacent to the opposite end of the shaft 23 is a driven gear 25, driven from a gear 26, in turn having driving connection with the clock mechanism, through the medium of a drive shaft 27. The drive shaft 27 has mounted thereon, rearwardly of the gear 26 a small spur gear 28, which meshes with a relatively large gear 29 that is fixed upon the rear end of the shaft 22. The rod 21 extends rearwardly of the shaft 22 and outwardly beyond the rear cover plate 9. The rod 21 is threaded at 30, for threaded engagement with a threaded lug 31 carried by the cover plate 9. A knurled head 32 is fixed upon the rear extremity of the rod 21 and serves as a means to rotate the rod for axial adjustment, which axial adjustment serves to accurately position the display disc 17. A lock nut 33, threaded upon the threaded portion 20 serves to rigidly fix the disc 17 with respect to the rod 21, while a wing nut 34 serves to lock the rod 21 against accidental rotation after the disc 17 has been accurately adjusted to be flush with the discs 10 and 14.

In the use of this form of the invention, the discs 10 and 14 are mounted usually by a press fit upon the forward ends of the shafts 22 and 23 so that they will be flush with respect to each other and flush with respect to the front wall face of the casing 5. The discs 10 and 14 will obviously be properly set with respect to each other and will be driven throughout the usual speed whereby the time will be indicated at the location of an indicating pointer 35 shown in Figures 1 and 2. The reduction drive from the shaft 27 has been calculated to drive the discs 10 and 14 in a clockwise direction as indicated in Figure 1 by the arrows. Since the disc 17 and the rod 21 have no driving action with the shafts 22 and 23, they may be completely removed and reinstalled at will however, it is not contemplated that the shaft 21 will be removed unless, it becomes necessary to remove the rear cover plate 9. The disc 17 carrying its particular display, such as advertising, pictorial displays, photographs or the like is threaded upon the threaded end 20 of the rod 21 to the point where the rear face of the hub 19 will abut the lock nut 33. However, if at this point the disc 17 is not flush with the disc 14, the wing nut 34 is loosened and the rod 21 rotated through the medium of the knurled head 32 for shifting the rod 21 axially under the influence of the threads 30 and, after adjustment the nut 34 is again tightened to prevent rotation of the shaft 21 and to maintain the disc 17 against accidental rotation that would destroy the effectiveness of a display thereon. The disc 17 is quickly and easily removed for redecorating its display surface, simply by loosening the nut 34 and, by holding the hand upon the face of the disc 17, the rod 21 is rotated in a direction to unscrew the hub 19 from locking engagement with the lock nut 33, after which the knurled head may be held stationary and the disc 17 rotated in an anti-clockwise direction to completely remove it from the threaded end 20. To replace, the reversed action will be obvious, the operator being careful when the disc is in the final adjusted position to have the display matter in its proper display angle.

In that form of the invention illustrated in Figure 4, there has been shown a pair of concentric and flush discs 36 and 37, constituting the minute and hour discs similar to the discs 10 and 14. The discs 36 and 37 are supported upon the tubular shafts 22 and 23 as before and with the disc 36 rotatable in the opening 7 of the clock casing to be flush with the forward wall 6. A display disc 38 has a centrally arranged threaded opening 39 that has threaded engagement upon that threaded portion 20 of the rod 21, while the lock nut 33 is employed to securely lock the disc 38 against accidental rotation with respect to the stationary rod 21. In this form of the invention, the disc 38 is arranged forwardly of the discs 36 and 37, and in some instances may be preferable to the arrangement of the discs as previously described. The display discs may be formed of any desirable material, either plastic or metal and stamped or moulded as may be found desirable, but in all instances having a flat forward display surface.

The form of the display disc shown in Figure 5 presents a further method of forming the disc by a sheet metal stamping, the disc indicated at 40, having a rearwardly stamped conical hub 41 that is centrally apertured and threaded at 42 for threaded engagement upon the threaded end 20 of the rod 21 to the point of locking engagement with the nut 33. Since the stamping of the head rearwardly will leave a central forwardly opening recess, it is proposed that the display matter for the forward face of the disc 40 be in the form of a sheet of display material 43 that is cemented to the forward face of the disc over its entire exposed area, thus completely covering the opening created by the hub 41.

It will be apparent from the foregoing that a very novel and highly desirable form of clock has been provided. The display disc presents considerable ornamental novelty to the clock that is interchangeable at the will of the operator and, when used in combination with the concentric flush discs of Figures 1 and 2 there will be provided an attractive and easily readable clock that has no hands and no projections that would detract from the overall flush construction.

It should further be noted, that while the discs 10 and 14 have not been stamped to provide Braille characters over the visual characters, it should be clearly understood that the indicia of the discs 10 and 14 may correspond with the combined visual and Braille time designations as shown in the co-pending application above identified.

It is to be understood that the invention is not limited to the precise construction shown but that changes are contemplated as readily fall within the spirit of the invention or the scope of the subjoined claim.

Having described my invention, what I claim as new and desire to secure by Letters Patent is:

A clock of the character described embodying a casing having a front wall that is provided with a relatively large circular opening, clockworks having a frame that is supported within the casing, a pair of time indicating discs that are rotatably supported in the opening of the casing, the discs being flat and flush with respect to each other and with the front wall of the casing, tubular and concentric drive shafts for the discs, the tubular drive shafts supported in bearings of the frame to be driven by the clockworks, a display disc that is arranged concentric to the time discs, the time discs being recessed for flush engagement with each other and one of the time discs being recessed for flush positioning of the display disc, a rod extending axially of the tubular shafts concentric thereto and projecting therebeyond at opposite ends, the rod having detachable threaded engagement with the display disc, the rod and its supported display disc being adjustable axially for flush positioning of the display disc, means for locking the display disc and its supporting rod against movement, the said rod extending rearwardly of the clock casing and with the extended portion being threaded, the rear wall of the clock casing provided with a threaded stud for the threaded reception of the extended rod, a head fixed upon the rear terminal end of the rod and a locking nut threaded upon the extended end of the rod for having locking engagement with the rear wall of the clock.

References Cited in the file of this patent

UNITED STATES PATENTS

| | | |
|---|---|---|
| 489,027 | McDonald | Jan. 3, 1893 |
| 2,091,146 | Hamilton | Aug. 24, 1937 |
| 2,168,314 | Blanks | Aug. 8, 1939 |

FOREIGN PATENTS

| | | |
|---|---|---|
| 130,707 | Germany | May 20, 1902 |
| 310,130 | Italy | July 28, 1933 |
| 48,869 | Switzerland | Oct. 14, 1909 |